(12) United States Patent
So et al.

(10) Patent No.: US 10,565,150 B2
(45) Date of Patent: Feb. 18, 2020

(54) HOT UNPLUG PREDICTIONS BASED ON LATCH POSITIONS DETECTED BY A SENSING CIRCUIT

(71) Applicant: Hewlett-Packard Development Company, L.P., Houston, TX (US)

(72) Inventors: Chi So, Houston, TX (US); Nam H Nguyen, Houston, TX (US); Ted T Nguy, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,818

(22) PCT Filed: Jul. 13, 2016

(86) PCT No.: PCT/US2016/042054
§ 371 (c)(1),
(2) Date: Oct. 30, 2018

(87) PCT Pub. No.: WO2018/013104
PCT Pub. Date: Jan. 18, 2018

(65) Prior Publication Data
US 2019/0138486 A1    May 9, 2019

(51) Int. Cl.
*G06F 13/40* (2006.01)
*G06F 1/26* (2006.01)

(52) U.S. Cl.
CPC ......... *G06F 13/4081* (2013.01); *G06F 1/266* (2013.01); *G06F 13/409* (2013.01)

(58) Field of Classification Search
CPC combination set(s) only.
See application file for complete search history.

(56) References Cited

U.S. PATENT DOCUMENTS

| 6,424,525 | B1 | 7/2002 | MacLeod et al. |
| 2002/0169913 | A1 | 11/2002 | Heilzer et al. |
| 2003/0063454 | A1 | 4/2003 | Wilson et al. |

(Continued)

FOREIGN PATENT DOCUMENTS

| TW | 200739094 A | 10/2007 |
| TW | M483460 U | 8/2014 |

OTHER PUBLICATIONS

Using the Module Bay, Aug. 2, 2004, <http://www.cs.utexas.edu/~deke/laptopsupport/manuals/d600/bay.htm>.

*Primary Examiner* — Raymond N Phan
(74) *Attorney, Agent, or Firm* — HP Inc. Patent Department"

(57) ABSTRACT

An example peripheral device includes a module interface to receive power and data communication from a computing device. The peripheral device also includes an attachment tab to affix the peripheral device to a lower side of the computing device. The peripheral device further includes a latch to control an engagement of the attachment tab with the computing device. The peripheral device further includes a sensing circuit to detect a change in position of the latch. The peripheral device further includes a controller to, in response to detecting the latch moving from a locked position to an unlocked position, indicate a hot unplug prediction to the computing device via the module interface.

15 Claims, 5 Drawing Sheets

(56) References Cited

U.S. PATENT DOCUMENTS

| | | | |
|---|---|---|---|
| 2003/0167367 A1* | 9/2003 | Kaushik | G06F 13/4081 |
| | | | 710/302 |
| 2004/0243725 A1 | 12/2004 | Yokovlev et al. | |
| 2014/0331009 A1 | 11/2014 | Parsonese et al. | |
| 2015/0162819 A1 | 6/2015 | Nguyen | |
| 2015/0234768 A1 | 8/2015 | Bass et al. | |
| 2015/0288098 A1 | 10/2015 | Kuo et al. | |

* cited by examiner

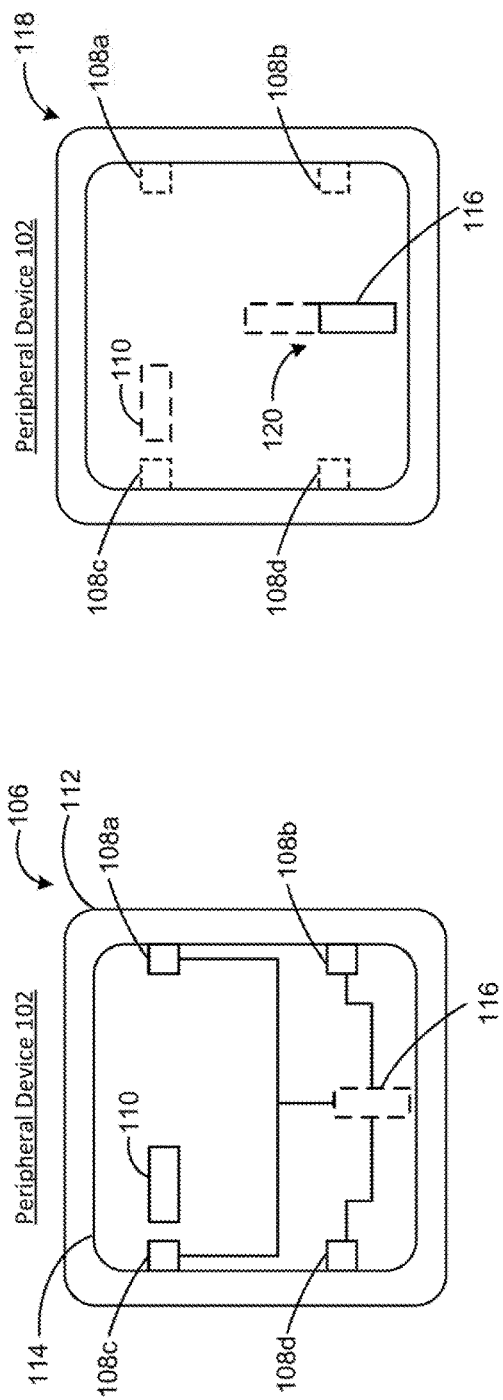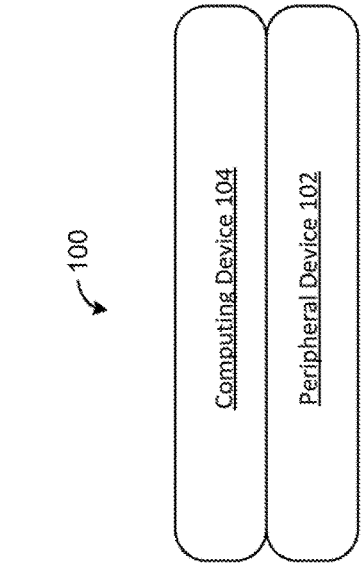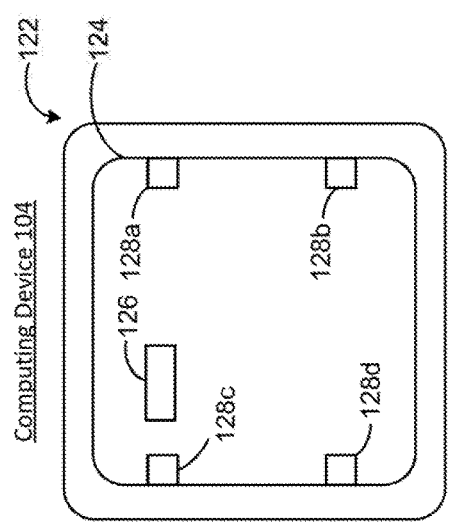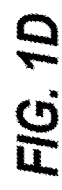

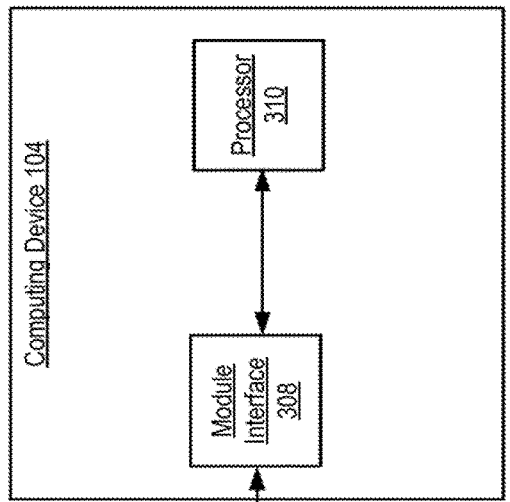
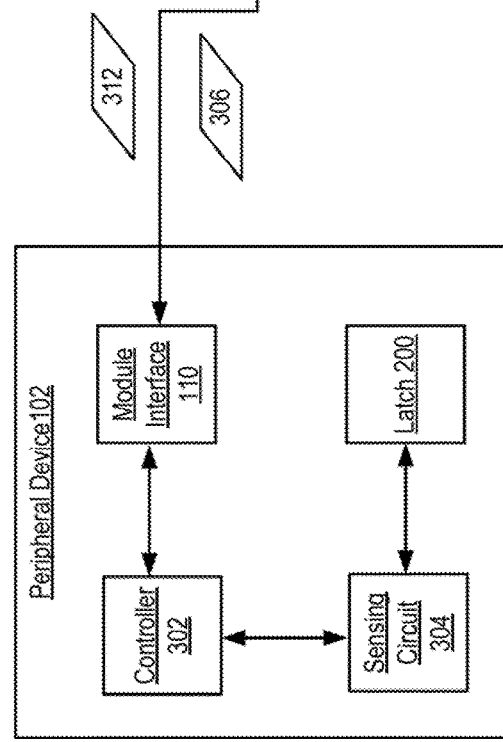
FIG. 3A
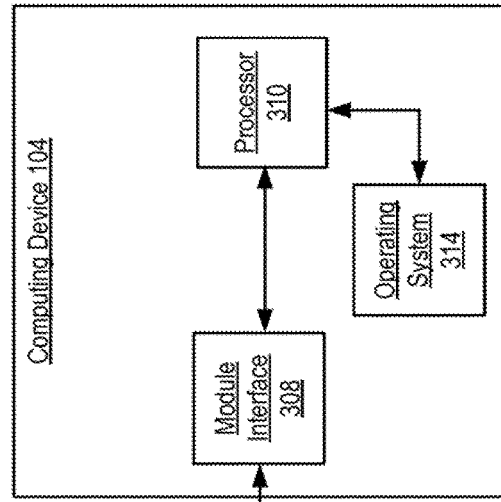
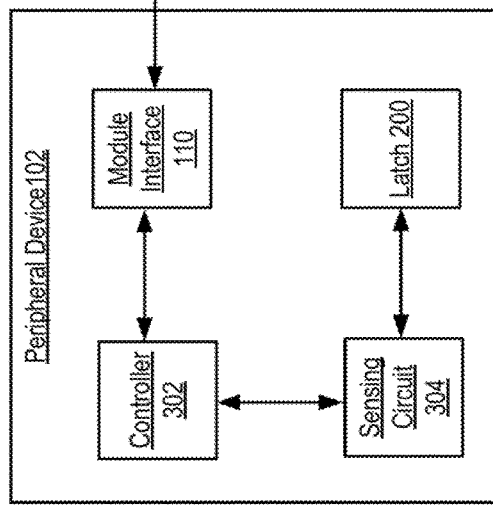
FIG. 3B

HOT UNPLUG PREDICTIONS BASED ON LATCH POSITIONS DETECTED BY A SENSING CIRCUIT

BACKGROUND

Some computing systems support hot unplug of hardware components. Hot unplug is the ability to remove a connected hardware component from the computing system while the computing system is powered on.

BRIEF DESCRIPTION OF THE DRAWINGS

Some examples of the present application are described with respect to the following figures:

FIG. 1A illustrates an upper side of a peripheral device that is to couple to a computing device or another peripheral device via a set of attachment tabs controlled by a latch, according to an example:

FIG. 1B illustrates a lower side of the peripheral device of FIG. 1A, according to an example;

FIG. 1C illustrates an lower side of a computing device that is to receive a set of attachment tabs from a peripheral device for coupling, according to an example;

FIG. 1D illustrates a side view of a modular computing system having a computing device coupled to a peripheral device, according to an example;

FIG. 3A illustrates a peripheral device to indicate a hot unplug prediction to a computing device based on a position of a latch in a peripheral device, according to an example;

FIG. 3B illustrates a peripheral device to indicate a hot unplug prediction to a computing device based on a position of a latch in a peripheral device, according to another example;

DETAILED DESCRIPTION

Figure 2:
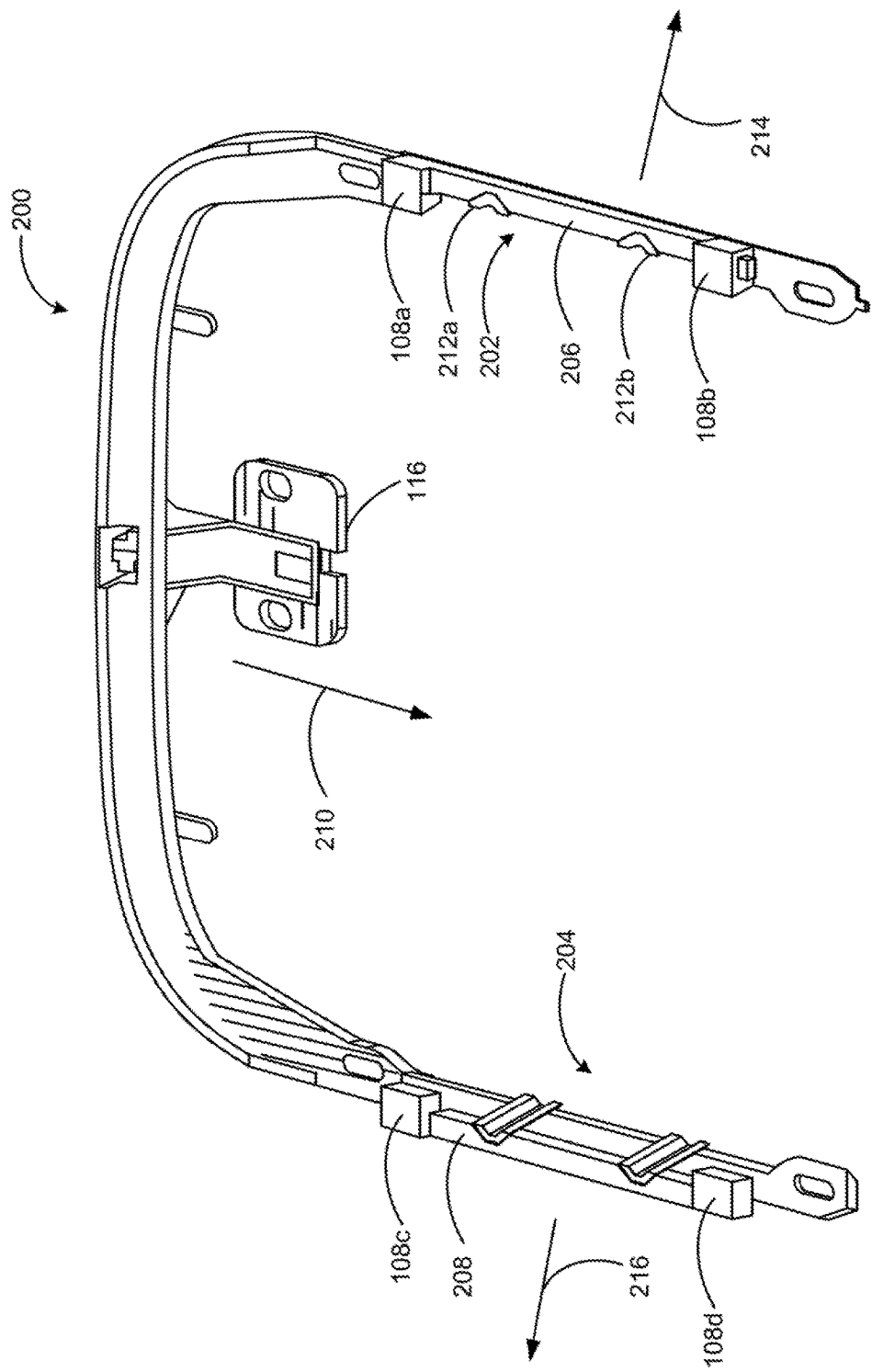
FIG. 2 illustrates a perspective view of a latch of the peripheral device of FIGS. 1A-1D to control an engagement of the set of attachment tabs with a computing device, according to an example.

Hot unplug of a hardware component may cause problems that affect the user experience and/or the performance of the computing system. For example, sparks may appear when a high powered hardware component is hot unplugged. As another example, the hardware component may suffer from physical damage when hot unplugged.

Examples described herein provide a modular computing system including a peripheral device. For example, the peripheral device may include a module interface to receive power and data communication from a computing device. The peripheral device may also include an attachment tab to affix the peripheral device to a lower side of the computing device. The peripheral device may further include a latch to control an engagement of the attachment tab with the computing device. The peripheral device may further include a sensing circuit to detect a change in position of the latch. The peripheral device may further include a controller to, in response to detecting the latch moving from an locked position to an unlocked position, indicate to the computing device a hot unplug prediction via the module interface. The modular computing system may also include a computing device. The computing device may include an extending region having an opening to receive the attachment tab. The computing device may also include a module interface to couple to the module interface of the peripheral device. The computing device may further include a processor to, in response to receiving the indication, perform an operation associated with the peripheral device via the module interface of the computing device. In this manner, examples described herein may reduce problems associated with hot swapping of hardware component, such as a peripheral device.

FIGS. 1A-1D illustrate a modular computing system 100 that includes a peripheral device 102 to indicate a hot unplug prediction to a computing device 104 based on a position of a latch (not shown in FIGS. 1A-1D) in peripheral device 102. Peripheral device 102 may be any device that provides an additional functionality to computing device 104. For example, peripheral device 102 may be a data storage device, such as a hard disk drive. As another example, peripheral device 102 may provide audio and/or video functionality, such as a speaker, a camera, etc. As another example, peripheral device 102 be an optical disk drive, such as a DVD drive. Computing device 104 may be, for example, a notebook computer, a desktop computer, an all-in-one system, a tablet computing device, a mobile phone, an electronic book reader, a modular computer, etc.

Turning to FIG. 1A which illustrates an upper side 106 of peripheral device 102 that is to couple to computing device 104 (not shown in FIG. 1A) or another peripheral device via a set of attachment tabs 108a-108d controlled by a latch in peripheral device 102, according to an example. Upper side 106 may include a module interface 110 to receive power and data communication from computing device 104. In an example, module interface 110 may be implemented as a Universal Serial Bus (USB) type-c connector. Upper side 106 may also include a raised region 112 and a recessed region 114 defined by raised region 112.

Upper side 106 may further include the set of attachment tabs 108a-108d. The set of attachment tabs 108a-108d may affix peripheral device 102 to computing device 104 when coupled. An engagement of the set of attachment tabs 108a-108d may be controlled by a latch unlocking tab 116 that is located at a lower side 118 (not shown in FIG. 1A) of peripheral device 102. For example, when latch unlocking tab 116 is at an unlocked position, the set of attachment tabs 108a-108d may be retracted into raised region 112. When latch unlocking tab 116 moves from the unlocked position to a locked position, the set of attachment tabs 108a-108d may extend from raised region 112 into recessed region 114.

Turning to FIG. 1B which illustrates lower side 118 of peripheral device 102 of FIG. 1A, according to an example. Lower side 118 may include an opening 120 that may expose latch unlocking tab 116 to a user of peripheral device 102 and may also accommodate latch unlocking tab 116 to change positions to control the engagement of the set of attachment tabs 108a-108d.

FIG. 1C illustrates an lower side 122 of computing device 104 that is to receive the set of attachment tabs 108a-108d from peripheral device 102 for coupling, according to an example. Lower side 122 may be received in recessed region 114 of peripheral device 102 when computing device 104 and peripheral device 102 are coupled to form modular computing system 100.

Lower side 122 may include an extended region 124 that extends from lower side 122. Extended region 124 may include a module interface 126 to couple to module interface 110 of peripheral device 102. Computing device 104 may supply power to peripheral device 102 and communicate with peripheral device 102 via module interface 126. Extended region 124 may also include a set of openings 128a-128d to receive the set of attachment tabs 108a-108d when the set of attachment tabs 108a-108d are extended. The number of openings in the set of openings 128a-128d may match the number of attachment tabs in the set of attachment tabs 108a-108d.

FIG. 1D illustrates a side view of modular computing system 100 having computing device 104 coupled to peripheral device 102, according to an example. When modular computing system 100 is formed by coupling computing device 104 to peripheral device 102, modular computing system 100 may be in a stacked configuration where computing device 104 may be located on top of peripheral device 102.

FIG. 2 illustrates a perspective view of a latch 200 of peripheral device 102 of FIGS. 1A-1D to control an engagement of the set of attachment tabs 108a-108d with computing device 104, according to an example. Latch 200 may include a first latch arm 202 and a second latch arm 204. Attachment tabs 108a -108b may be linked together via a first link member 206. In some examples, attachment tabs 108a-108b and first link member 206 may be formed as a single piece. Attachment tabs 108a-108b and first link member 206 may be in physical contact with first latch arm 202. Similarly, attachment tabs 108c -108d may be linked together via a second link member 208. Attachment tabs 108c-108d and second link member 208 may be in physical contact with second latch arm 204.

During operation, when the set of attachment tabs 108a-108d is to be retracted into raised region 112 of peripheral device 102, latch 200 may be moved from a locked position to an unlocked position (as indicated by an arrow 210) via latch unlocking tab 116 controlled by a user. Wedges 212a-212b of first latch arm 202 may push against first link member 206 so that first link member 206 and attachment tabs 108a-108b are moving away from first latch arm 202 (as indicated by an arrow 214). Wedges 212c-212d of second latch arm 204 may push against second link member 208 so that second link member 208 and attachment tabs 108c-108d are moving away from second latch arm 204 (as indicated by an arrow 216). Thus, the set of attachment tabs 108a-108d may be retracted into raised region 112.

To extend the set of attachment tabs 108a-108d into recessed region 114, springs (not shown) may be used. For example, springs may be placed against tips of latch arms 202 and 204 and against link members 206 and 208. Thus, the set of attachment tabs 108a-108d may be pushed toward latch unlocking tab 116 and latch 200 may return to the unlocked position automatically when latch 200 is at the locked position. As described in more details in FIGS. 3A-5, by detecting the position of latch 200, peripheral device 102 may determine if peripheral device 102 is about to be removed from computing device 104, Thus, peripheral device 102 may predict an upcoming hot unplug of peripheral device 102 from computing device 104.

FIG. 3A illustrates peripheral device 102 to indicate a hot unplug prediction to computing device 104 based on a position of latch 200, according to an example. In addition to module interface 110 and latch 200, peripheral device 102 may include a controller 302. Controller 302 may control operations of peripheral device 102. Controller 302 may be a central processing unit (CPU), a semiconductor-based microprocessor, and/or other hardware devices suitable for retrieval and execution of instructions stored in a computer-readable storage medium.

Peripheral device 102 may also include a sensing circuit 304 that detects positions of latch 200. Sensing circuit 304 may detect positions of latch 200 in a variety of ways. In an example, a ground wire may be integrated into latch 200. When latch 200 is at the locked position (e.g., the set of attachment tabs 108a-108d are extended into recessed region 114), the ground wire may complete a ground wire loop in sensing circuit 304. When latch 200 is at the unlocked position (e.g., the set of attachment tabs 108a-108d are retracted from recessed region 114), the ground wire may be retracted from the ground wire loop to create an open circuit. Sensing circuit 304 may detect the open circuit and indicate to controller 302 that an open circuit is present. The indication of an open circuit in sensing circuit 304 may indicate that latch 200 has changed from the unlocked position to the locked position and that peripheral device 102 may be hot unplugged from computing device 104.

In response to detecting the open circuit via sensing circuit 304, controller 302 may indicate a hot unplug prediction 306 to computing device 104 via module interface 110. Controller 302 may indicate hot unplug prediction 306 to computing device 104 in different ways. For example, controller 302 may indicate hot unplug prediction 306 as a voltage level output via module interface 110. Computing device 104 may sense the voltage level via a module interface 308 of computing device 104 that is coupled to module interface 110. In another example, controller 302 may generate hot unplug prediction 306 as a message and send the message to computing device 104 via module interface 110. Computing device 104 may receive the message via module interface 308.

In response to detecting hot unplug prediction 306 via module interface 308, computing device 104 may perform an operation associated with peripheral device 102. For example, a processor 310 of computing device 104 may reduce an amount of power provided to peripheral device 102 via module interface 308. In another example, processor 310 may generate a command 312 to instruct peripheral device 102 to perform an operation. Processor 310 may transmit command 312 to peripheral device 102 via module interface 308. In response to receiving command 312 via module interface 110, peripheral device 102 may perform the operation. In an example, the operation may include instructing peripheral device 102 to power down based on command 312. In another example, the operation may include changing an operating parameter of a component of peripheral device 102.

Computing device 104 may select the type of operation to be performed based on a function of peripheral device 102. For example, when peripheral device 102 is an optical disk drive, the change of the operating parameter of the component may include removing the read/write head of the optical disk drive from an optical disk in the optical disk drive. When peripheral device is a hard disk drive, the change of the operating parameter of the component may include removing a read/write head of the hard disk drive from the hard disk drive platter. As another example, when peripheral device is a hard disk drive, the operation may include performing a cache flushing operation at the hard disk drive. In addition to instructing peripheral device 102 to prepare for the upcoming hot unplug, computing device 104 may also instruct a component of computing device 104 to prepare for the hot unplug. This is described in more detail in FIG. 3B.

FIG. 3B illustrates peripheral device 102 to indicate a hot unplug prediction to computing device 104 based on a position of latch 200, according to another example. In response to detecting hot unplug prediction 306, processor 310 may inform an operating system 314 of computing device 104 about the upcoming hot unplug so that operating system 314 may prepare for the hot unplug. In an example, operating system 314 may stop or halt any software applications that are interacting with peripheral device 102. In another example, operating system 314 may generate and display a hot unplug warning message and display the warning message so the user of computing device 104 is aware of the upcoming hot unplug.

Figure 4:
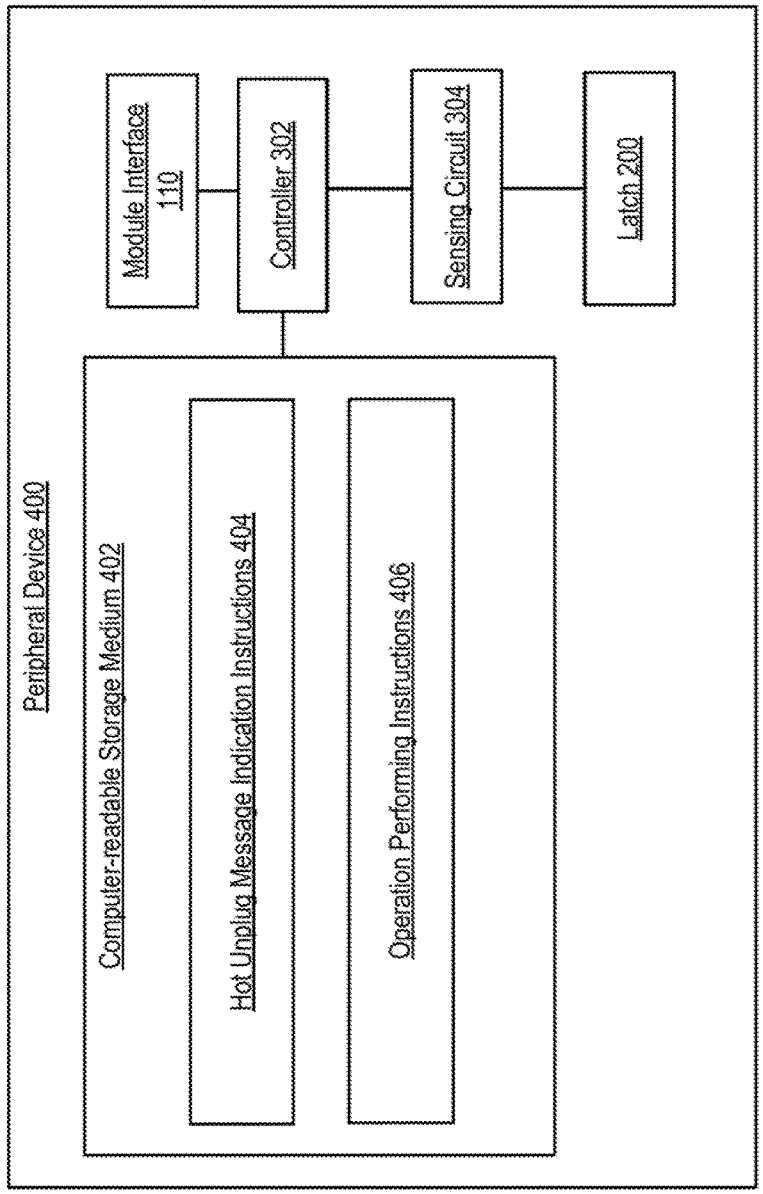
FIG. 4 illustrates a peripheral device to indicate a hot unplug prediction to a computing device based on a position of a latch in a peripheral device, according to another example.

FIG. 4 illustrates a peripheral device 400 to indicate a hot unplug prediction to a computing device based on, a position of a latch in a peripheral device, according to another example. Peripheral device 400 may implement peripheral device 102 of FIGS. 1A-3B. Peripheral device 400 may include module interface 110, controller 302, sensing circuit 304, latch 200, and a computer-readable storage medium 402. Computer-readable storage medium 402 may be any electronic, magnetic, optical, or other physical storage device that contains or stores executable instructions. Thus, computer-readable storage medium 402 may be, for example, Random Access Memory (RAM), an Electrically Erasable Programmable Read-Only Memory (EEPROM), a storage device, an optical disc, etc. In some examples, computer-readable storage medium 402 may be a non-transitory storage medium, where the term "non-transitory" does not encompass transitory propagating signals. Computer-readable storage medium 402 may be encoded with a series of processor executable instructions 404 and 406.

Hot unplug message indication instructions 404 may indicate a hot unplug prediction to a computing device via module interface 110 in response to detecting latch 200 changing from a locked position to an unlocked position. For example, referring to FIG. 3A, in response to detecting the open circuit via sensing circuit 304, controller 302 may indicate a hot unplug prediction 306 to computing device 104 via module interface 110. Operation performing instructions 406 may perform an operation at peripheral device 400 based on a command received from the computing device. For example, referring to FIG. 3B, in response to receiving command 312 via module interface 110, peripheral device 102 may perform the operation. In an example, the operation may include instructing peripheral device 102 to power down based on command 312. In another example, the operation may include changing an operating parameter of a component of peripheral device 102.

Figure 5:
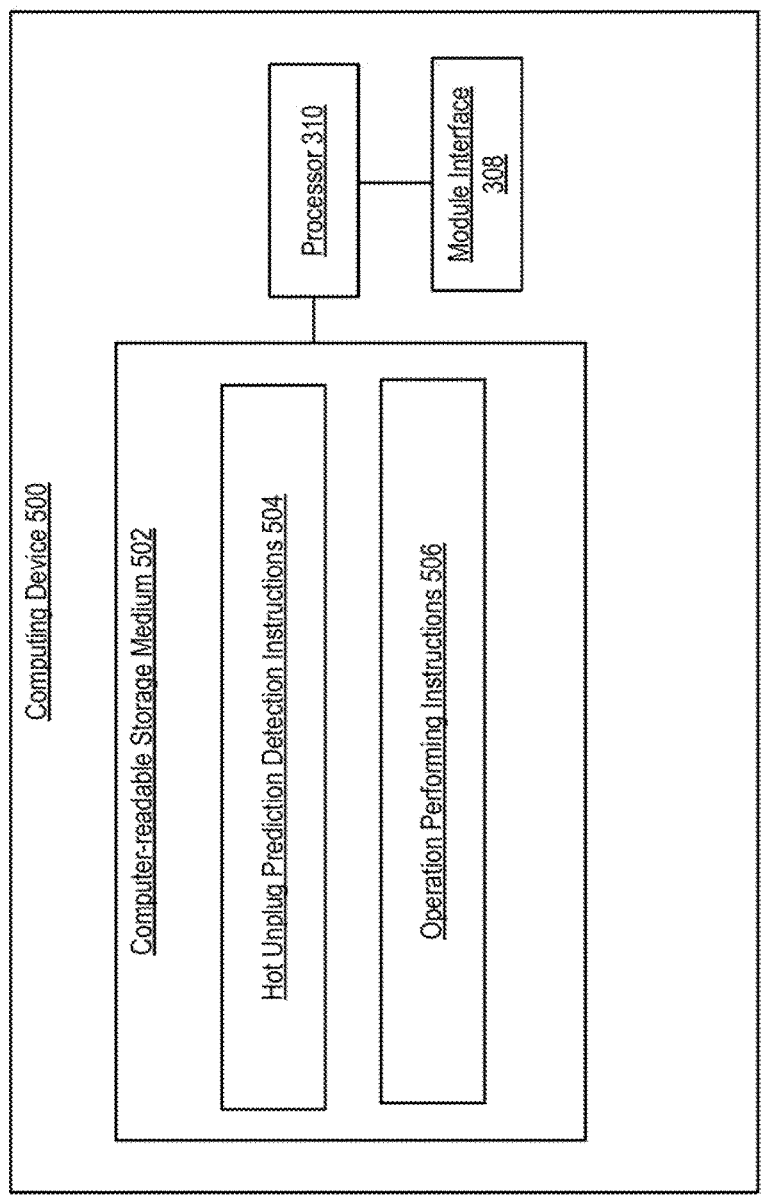
FIG. 5 illustrates a computing device to perform an operation associated with a peripheral device in response to detecting a hot unplug prediction from the peripheral device, according to an example.

FIG. 5 illustrates a computing device 500 to perform an operation associated with a peripheral device in response to detecting a hot unplug prediction from the peripheral device, according to an example. Computing device 500 may implement computing device 104 of FIGS. 1A-3B. Computing device 500 may include processor 310, module interface 308, and a computer-readable storage medium 502. Computer-readable storage medium 502 may be similar to computer-readable storage medium 402 of FIG. 4. Computer-readable storage medium 502 may be encoded with instructions 504 and 506.

Hot unplug prediction detection instructions 504 may detect, via module interface 308, a hot unplug prediction from a peripheral device attached to computing device 500. For example, referring to FIG. 3A, controller 302 may indicate hot unplug prediction 306 as a voltage level output via module interface 110. Computing device 104 may sense the voltage level via a module interface 308 of computing device 104 that is coupled to module interface 110. In another example, controller 302 may generate hot unplug prediction 306 as a message and send the message to computing device 104 via module interface 110. Computing device 104 may receive the message via module interface 308. Operation performing instructions 506 may perform an operation associated with the peripheral device in response to detecting the hot unplug prediction. For example, referring to FIG. 3A, in response to detecting hot unplug prediction 306 via module interface 308, computing device 104 may perform an operation associated with peripheral device 102.

The use of "comprising", "including" or "having" are synonymous and variations thereof herein are meant to be inclusive or open-ended and do not exclude additional unrecited elements or method steps.

What is claimed is:

1. A modular computing system comprising:
    a peripheral device including:
        a module interface to receive power and data communication from a computing device;
        an attachment tab to affix the peripheral device to a lower side of the computing device
        a latch to control an engagement of the attachment tab with the computing device;
        a sensing circuit to detect a change in position of the latch, wherein the change in position of the latch creates an open circuit that is detected by the sensing circuit; and
        a controller to, in response to detecting the latch moving from an unlocked position to a locked position, indicate a hot unplug prediction to the computing device via the module interface.

2. The modular computing system of claim 1, wherein the computing device comprises:
    an extended region having an opening to receive the attachment tab;
    a module interface of the computing device to couple to the module interface of the peripheral device; and
    a processor to, in response to detecting the indication, perform an operation associated with the peripheral device via the module interface of the computing device.

3. The modular computing system of claim 2, wherein the operation includes reducing an amount of power provided to the peripheral device.

4. The modular computing system of claim 2, wherein the operation includes instructing the peripheral device to change an operating parameter of a component of the peripheral device.

5. The modular computing system of claim 2, wherein the processor is to selectively perform the operation based on a function of the peripheral device.

6. A non-transitory computer-readable storage medium comprising instructions that when executed cause a controller of a peripheral device to:
    in response to detecting a latch of the peripheral device moving from a locked position to an unlocked position, indicate a hot unplug prediction to a computing device via a module interface of the peripheral device, wherein the peripheral device is to receive power and data communication from the computing device via the module interface, wherein moving from the locked position to the unlocked position of the latch creates an open circuit that is detected by a sensing circuit; and perform an operation at the peripheral device based on a command received from the computing device, wherein the command is generated by the computing device in response to receiving the indication of the hot unplug prediction.

7. The non-transitory computer-readable storage medium of claim 6, wherein the operation includes changing an operating parameter of a component of the peripheral device based on the command.

8. The non-transitory computer-readable storage medium of claim 6, wherein the operation includes powering off the peripheral device based on the command.

9. The non-transitory computer-readable storage medium of claim 6, wherein the peripheral device is to receive a reduced amount of power via the module interface of the computing device after the indication.

10. A non-transitory computer-readable storage medium comprising instructions that when executed cause a processor of a computing device to:

detect an indication of a hot unplug prediction from a peripheral device via a module interface of the computing device, wherein the hot unplug prediction is generated in response to detecting a change in position of a latch of the peripheral device via a sensing circuit of the peripheral device, and wherein the computing device is to supply power and to communicate with the peripheral device via the module interface, wherein the change in position of the latch creates an open circuit that is detected by the sensing circuit; and in response to detecting the hot unplug prediction, perform an operation associated with the peripheral device.

11. The non-transitory computer-readable storage medium of claim 10, wherein the operation includes reducing an amount of power provided to the peripheral device.

12. The non-transitory computer-readable storage medium of claim 10, wherein the operation includes instructing the peripheral device to change an operating parameter of a component of the peripheral device.

13. The non-transitory computer-readable storage medium of claim 10, wherein the operation includes instructing an operating system of the computing device to prepare for an upcoming hot unplug of the peripheral device.

14. The non-transitory computer-readable storage medium of claim 10, wherein the operation includes instructing the peripheral device to power off.

15. The non-transitory computer-readable storage medium of claim 10, wherein the operation is selectively performed based on a function of the peripheral device.

* * * * *